United States Patent [19]
Schanz et al.

[11] 3,961,690
[45] June 8, 1976

[54] DISC BRAKE

[75] Inventors: Johannes Schanz, Offenbach; Jochen Burgdorf, Bad Homburg, both of Germany

[73] Assignee: ITT Industries, Inc., New York, N.Y.

[22] Filed: Aug. 11, 1975

[21] Appl. No.: 603,850

Related U.S. Application Data

[63] Continuation of Ser. No. 530,314, Dec. 6, 1974, abandoned.

[30] Foreign Application Priority Data

Feb. 20, 1974 Germany............................ 2408075

[52] U.S. Cl............................. 188/1 A; 116/114 Q; 188/73.3

[51] Int. Cl.²......................................... F16D 66/00

[58] Field of Search................ 188/71.1, 73.1, 73.3, 188/73.4, 72.4, 72.5, 250 B, 1 A; 116/114 Q

[56] References Cited
UNITED STATES PATENTS

| | | | |
|---|---|---|---|
| 3,003,587 | 10/1961 | Garrett | 188/73.3 X |
| 3,502,183 | 3/1970 | Hahm | 188/250 B |

FOREIGN PATENTS OR APPLICATIONS

| | | | |
|---|---|---|---|
| 2,014,468 | 10/1970 | Germany | 188/73.3 |

*Primary Examiner*—George E. A. Halvosa
*Attorney, Agent, or Firm*—John T. O'Halloran; Menotti J. Lombardi, Jr.; Alfred C. Hill

[57] ABSTRACT

A floating-caliper disc brake includes a stationary brake carrier and a stop thereon to limit the maximum travel of the floating caliper to a given distance. This reduces the space required to mount the disc brake, and the driver is able to notice wear of the brake pads.

6 Claims, 3 Drawing Figures

DISC BRAKE

CROSS REFERENCE TO RELATED APPLICATIONS

This is a continuation of application Ser. No. 530,314, filed Dec. 6, 1974, now abandoned.

BACKGROUND OF THE INVENTION

This invention relates to a disc brake having a stationary brake carrier and a floating caliper which is guided by the brake carrier to be transversely movable relative to the plane of the brake disc, having a first brake pad which is directly supported by the floating caliper in a parallel relationship to the plane of the brake disc, and having a second brake pad on the side of the brake disc opposite to the first brake pad, the second brake pad being supported at a working piston of a brake cylinder.

Such disc brakes are generally used for present day passenger cars.

It becomes increasingly difficult to mount disc brakes inside the wheel dish on account of the types of wheel suspensions which at present are favored by car manufacturers. In contrast to the fixed-caliper disc brakes which previously were used, floating-caliper disc brakes need considerably less space since they require a brake cylinder with a working piston on only one side of the brake disc. With floating-caliper disc brakes, however, there must be taken into account that due to wear of the brake pad opposite to the brake piston, the floating caliper together with the brake cylinder shifts in the direction of the side having the brake cylinder by the amount of the brake pad wear. This shifting travel has to be taken into account when mounting floating-caliper disc brakes.

SUMMARY OF THE INVENTION

It is the object of the present invention to provide a floating-caliper disc brake which may be mounted in a space as small as possible.

A feature of the present invention is the provision of a disc brake comprising a brake disc rotatable in a given plane; a stationary brake carrier; a floating-caliper embracing the disc and slideably guided by the carrier in transverse moveable relationship to the given plane; a brake cylinder having a working piston supported by the caliper; a first brake pad supported at and actuated by the working piston, the first pad being disposed in a parallel relation to the given plane; a second brake pad supported by the caliper on a side of the disc remote from the cylinder, the second pad being disposed in a parallel relation to the given plane; and a stop carried by the carrier to limit the maximum shifting travel of the caliper to a given distance, the given distance being less than the thickness of the second pad.

As mentioned in the above feature the object of this invention is achieved by limiting the maximum shifting travel of the floating caliper to a given distance by a stop carried by the brake carrier. The given distance is smaller than the brake pad thickness supported at the floating caliper remote from the brake cylinder. From this design there ensues that in the first instance the inventive disc brake may be regarded as floating-caliper disc brake. When the brake pads are largely worn, the floating-caliper disc brake is converted into a fixed-caliper disc brake, which is actuated unilaterally.

In this method, the space occupied by the disc brake is diminished in the direction toward the inside of the vehicle, since the maximum shifting travel of the floating caliper is limited. As soon as the floating caliper is shifted against the stop, elastic deformations have to occur when the brake is actuated. Primarily, the deformations are based on the fact that the brake pad on the side closest to the brake cylinder deforms the brake disc and presses it against the other brake pad. Thereby the actuation travel of the disc brake increases with advancing brake pad wear from the moment that the floating caliper has reached the stop. From this there ensues that the driver is able to notice wear of the pad without the vehicle being provided with additional warning devices for brake pad wear. Moreover, this effect is increased owing to the fact that the work done in deformation, which work is necessary for brake actuation, leads to higher brake pedal forces without the braking forces being increased.

An advantageous embodiment of this invention is that the brake pad on the side closest to the brake cylinder working piston is designed with a larger pad volume than the opposite brake pad. This measure ensures that the brake pad being directly supported by the floating caliper opposite the working piston always wears first. As described above, wear of this brake pad, however, can be noticed by the driver. Thus, warning devices for brake pad wear become completely superfluous. In case of identical brake pads, a warning device for brake pad wear in the brake pad on the side closest to the brake cylinder working piston is sufficient so that expenditure is saved relative to known disc brakes.

In order to further diminish the space occupied and the constructive expenditure, it is favorable to design the brake pad opposite to the brake cylinder without a pad backing plate. This space is gained on the side of the disc brake remote from the brake cylinder, i.e. in the wheel dish. This had not been possible with the previously known disc brakes having a floating caliper, since it had to be feared that the floating caliper would move against the brake disc when the brake pad was completely worn, and that the brake disc or the floating caliper could be damaged or destroyed. But since in this inventive disc brake the maximum shifting travel of the floating caliper is limited, this danger is averted. In order to avoid squealing noises, and according to this invention, the brake pad opposite to the brake cylinder does not abut the floating caliper in a middle zone.

BRIEF DESCRIPTION OF THE DRAWINGS

Above-mentioned and other features and objects of this invention will become more apparent by reference to the following description taken in conjunction with the accompanying drawing, in which.

DESCRIPTION OF THE PREFERRED EMBODIMENT

Figure 1:
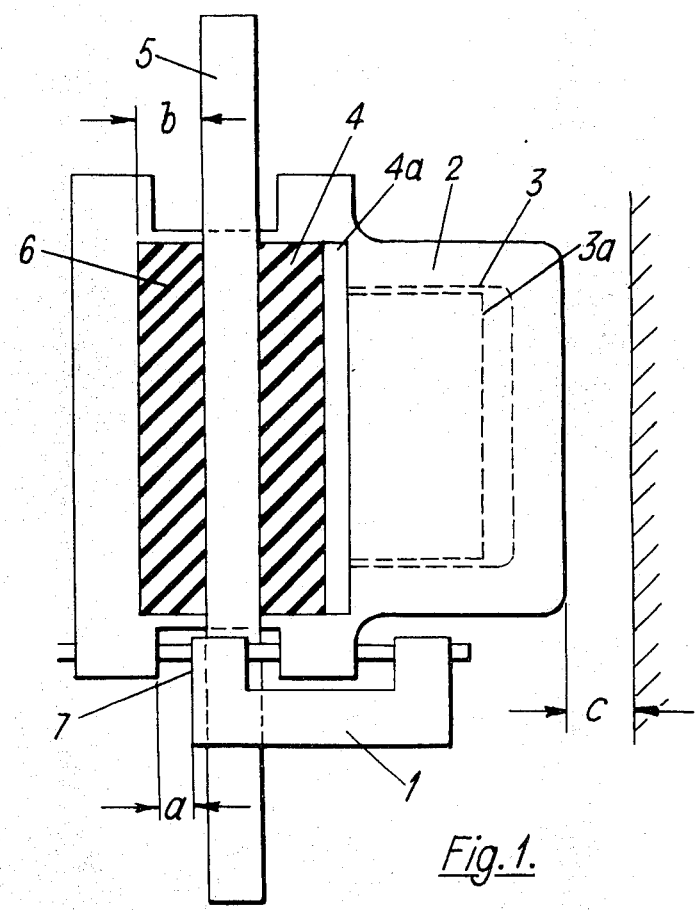
FIG. 1 is a diagrammatic top view of the floating-caliper disc brake in accordance with the principles of the present invention.
Figure 2:
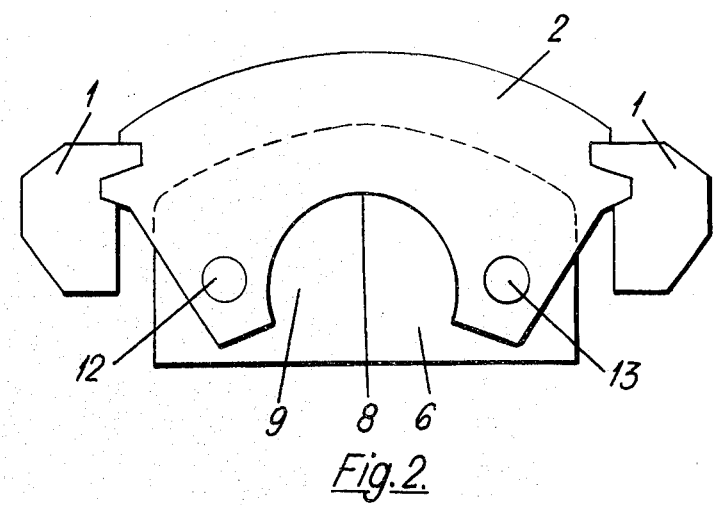
FIG. 2 is a diagrammatic front view of FIG. 1.
Figure 3:
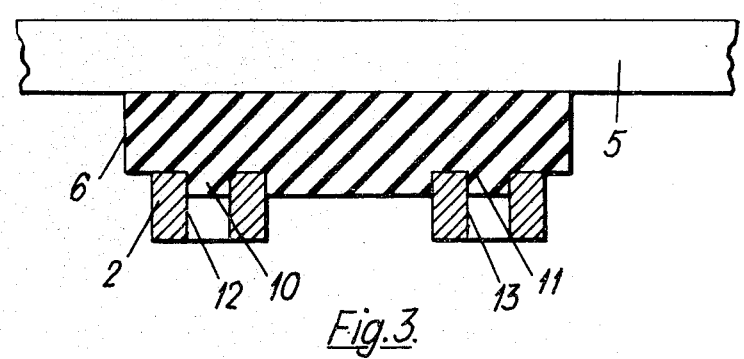
FIG. 3 is a top view of a sector of FIG. 2.

The disc brake of this invention illustrated in FIGS. 1, 2, and 3 includes a brake carrier 1 guiding a floating caliper 2. As it is usual, the brake carrier 1 is stationarily connected to the wheel suspension so that the brake torque can be transferred to brake carrier 1. Floating caliper 2 has a brake cylinder 3, which is illustrated in FIG. 1 by a dotted line. A working piston 3a, illustrated in FIG. 1 by a dotted line, is slideably sealed to brake cylinder 3. Piston 3a abuts backing plate 4a of a first brake pad 4. This brake pad 4 is movable against a brake disc 5 by the brake or working piston 3a. On the side of brake disc 5 opposite to brake pad 4, a second brake pad 6 is provided which is directly supported by brake caliper 2.

The construction of the illustrated disc brake, which was described up to here, fully corresponds to prior art, and every expert is familiar with it. For brake actuation, brake pad 4 moves against brake disc 5. Floating caliper 2 shifts to the right-hand side, as seen in the drawing, and, thus, also moves brake pad 6 against brake disc 5.

It can be seen from the drawing that floating caliper 2 moves to the right a distance dependent upon the extent of wear of brake pad 6. If, with an occasional overhaul of the braking system, the brake disc is reground, the shifting travel of floating caliper 2 will increase further.

In order to limit this shifting travel, according to this invention, a stationary stop 7 is provided carried by brake carrier 1. Floating caliper 2 moves to the right in the drawing until it abuts stop 7. In FIG. 1, the maximum shifting travel of floating caliper 2 relative to brake carrier 1 is indicated by the dimension $a$. This maximum shifting travel is smaller than the pad or thickness of brake pad 6, which is indicated by a dimension $b$. From this there ensues that, when pad 6 is worn by the amount $a$, no further shifting of brake caliper 2 can occur, and that the driver is able to notice this state of the braking system by an increase in brake pedal force without a corresponding increase in braking force. This increase in brake pedal force is the force necessary to deform brake disc 5 to enable braking by brake pad 6. Thus, the clearance between the vehicle frame and the caliper 2, indicated by the dimension $c$ can be reduced relative to known floating-caliper disc brake resulting in a reduction of space required for mounting the inventive disc brake. Dimension $c$ is approximately equal to dimension $b$.

FIG. 2 shows an advantageous embodiment of this invention. According thereto, floating caliper 2 is designed like a fist. It has a central aperture 8 so that brake pad 6 does not abut floating caliper 2 in a middle zone 9.

FIG. 3 shows that the pad in the middle zone 9 is thicker than in the remaining zone so that brake pad 6 projects into aperture 8 of floating caliper 2. This arrangement prevents the brake pad from shifting laterally during the braking process. In addition, this effect is increased by the fact that brake pad 6 projects with knubs 10 and 11 in corresponding openings 12 and 13 of floating caliper 2.

While we have described above the principles of our invention in connection with specific apparatus it is to be clearly understood that this description is made only by way of example and not as a limitation to the scope of our invention as set forth in the objects thereof and in the accompanying claims.

We claim:

1. A disc brake comprising:
a brake disc rotatable in a given plane;
a stationary brake carrier;
a floating caliper embracing said disc and slideably guided by said carrier in transverse moveable relationship to said given plane;
a brake cylinder having a working piston supported by said caliper;
a first brake pad supported at and actuated by said working piston, said first pad being disposed in a parallel relation to said given plane;
a second brake pad supported by said caliper on a side of said disc remote from said cylinder, said second pad being disposed in a parallel relation to said given plane;
a stationary stop carried by said carrier to limit the maximum shifting travel of said caliper to a given distance when said caliper abuts said stop, said given distance being less than the thickness of said second pad;
said caliper having a first outward projection adjacent said first brake pad and a second outward projection adjacent said second brake pad;
said carrier having a U-shape with first and second legs extending toward said caliper and embracing said first projection, said first leg being disposed adjacent said brake cylinder and spaced from said first projection and said second leg being disposed between and spaced from said first and second projections, said second leg carrying said stop on a surface thereof parallel to and adjacent said second projection and being spaced from said second projection said given distance; and
a stationary rod extending through the ends of said first and second projections and the ends of said first and second legs to assist in slideably guiding said caliper.

2. A disc brake according to claim 1, wherein said first pad has a greater volume than said second pad.

3. A disc brake according to claim 2, wherein a portion of said caliper remote from said cylinder provides a backing plate for said second pad.

4. A disc brake according to claim 3, wherein material is removed from a middle zone of said portion of said caliper.

5. A disc brake according to claim 4, wherein said portion of said floating caliper includes
an aperture in said middle zone, and
a middle zone of said second pad is thicker than the remainder of said second pad and projects into and is supported by said aperture.

6. A disc brake according to claim 5, wherein said caliper includes
a pair of openings adjacent said middle zone of said portion of said caliper; and
said second pad includes
a pair of knubs adjacent said middle zone of said second pad, each of said pair of knubs projecting into a different one of said pair of openings.

* * * * *